United States Patent [19]
Smith, III

[11] Patent Number: 5,983,934
[45] Date of Patent: Nov. 16, 1999

[54] UNDERSEA HYDRAULIC COUPLING WITH THREE RETAINED SEALS

[75] Inventor: Robert E. Smith, III, Missouri City, Tex.

[73] Assignee: National Coupling Company, Inc., Stafford, Tex.

[21] Appl. No.: 09/008,450

[22] Filed: Jan. 16, 1998

[51] Int. Cl.[6] ............................................. F16L 37/28
[52] U.S. Cl. ............................... 137/614.04; 251/149.7; 285/108; 285/111; 285/917
[58] Field of Search ............... 137/614.04, 614; 251/149.7, 149.6; 285/108, 111, 110, 917

[56] References Cited

U.S. PATENT DOCUMENTS

| | | | |
|---|---|---|---|
| 5,203,374 | 4/1993 | Smith, III | 137/614.04 |
| 5,232,021 | 8/1993 | Smith | 137/614.04 |
| 5,390,702 | 2/1995 | Smith, III | 137/614.04 |
| 5,469,887 | 11/1995 | Smith, III | 137/614.04 |

*Primary Examiner*—Denise L. Ferensic
*Assistant Examiner*—Joanne Y. Kim
*Attorney, Agent, or Firm*—Arnold, White & Durkee

[57] ABSTRACT

An undersea hydraulic coupling has a male member with a stepped outer body that may be inserted into a female member having a bore which has retained therein three seals and a three part seal retaining member. Two of the seals engage different diameters of the male member, prior to opening of the valves in the male and female members.

15 Claims, 4 Drawing Sheets

UNDERSEA HYDRAULIC COUPLING WITH THREE RETAINED SEALS

BACKGROUND OF THE INVENTION

1. Field of the Invention

The present invention relates to hydraulic couplings used in undersea drilling and production applications and seals used in those couplings. More particularly, the invention involves an undersea hydraulic coupling with three retained seals, at least one being an elastomeric seal that is restrained from radial movement into the bore of the female member by a dovetail interfit with a seal retainer, and at least one being a radial metal seal retained in the female member bore, wherein two of the seals engage different diameters on the outer circumference of the male member of the coupling.

2. Description of the Related Art

Subsea hydraulic couplings are old in the art. The couplings generally consist of a male member and a female member with soft seals positioned within the female member to seal the junction between the male and female members.

The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion or probe at one end having a diameter approximately equal to the diameter of the large bore in the female portion of the coupling. The male member also includes a connection at its other end to facilitate connection to hydraulic lines. When the cylindrical portion of the male member is inserted into the large bore of the female member, according to the various embodiments of the device, the soft seals, or o-rings, either abut the end or face of the male member or engage the cylindrical probe wall about its outer circumference. The hydraulic fluid is then free to flow through the female and male members of the coupling, and the seals prevent that flow from escaping about the joint and the coupling.

In some instances, a check or poppet valve may be installed in the female member and also in the male member. Each valve opens when the coupling is made up and closes when the coupling is broken so as to prevent fluid from leaking out of the system of which the coupling is a part.

In U.S. Pat. No. 4,694,859 to Robert E. Smith III, assigned to National Coupling Company, Inc. of Stafford, Tex., an undersea hydraulic coupling and metal seal is disclosed. This patent provides a reusable metal seal which engages the circumference of the probe and is positioned within the female member body. The metal seal is held in place by a retainer. A clip holds the retainer within the body, preventing escape of the retainer or metal seal from the body. When the male and female portions of the coupling are parted under pressure, the retainer prevents the metal seal from blowing out through the bore of the female member.

U.S. Pat. No. 4,694,859 also discloses a soft annular seal or o-ring at the inner cylindrical surface of the retainer, which engages the probe's circumference. The soft annular seal generally is used as a secondary seal, to prevent escape of hydraulic fluid should the metal seal fail. As the probe begins to enter the retainer bore, it begins to engage a soft annular seal intermediate the retainer bore. This contact compresses the seal and creates a sliding seal between it and the probe wall. The annular seal or soft seal is of a relatively pliable material, for example, rubber or synthetic elastomer. The annular seal is generally ring-shaped and is located in a sealed groove.

U.S. Pat. No. 5,052,439 to Robert E. Smith, III, assigned to National Coupling Company, Inc. of Stafford, Tex., discloses an undersea hydraulic coupling having an elastomeric seal configured to engage the male member as it is inserted into the bore of the female member, in which the elastomeric seal is interposed between a two-piece retainer and has a dovetail interfit whereby the elastomeric seal is restrained from radial movement into the central bore and is retained in the female member upon separation of the female member and the male member. Additionally, U.S. Pat. No. 4,900,071 discloses an undersea hydraulic coupling having an elastomeric dovetail seal and an annular metal seal which also engages the outer circumference of the male member or probe wall.

In U.S. Pat. Nos. 4,832,080, 5,099,882 and 5,277,225 to Robert E. Smith, III, undersea hydraulic couplings are shown having at least two radial metal seals for sealing between the male member and the female member bore. Pressure energized seals are shown which are configured to seal radially between the male and female members, and the couplings are pressure balanced for fluid communication through mating radial passages and the annular space between the members.

Additionally, U.S. Pat. No. 5,390,702 to Robert E. Smith, III discloses an undersea hydraulic coupling having a male member with a stepped outer body that is inserted into a female member with a stepped internal bore. This step ensures that the male member is more accurately positioned and guided into the seals in the bore, ensuring greater seal reliability and longer seal life. The stepped surfaces also help prevent implosion of the seals due to sea pressure when the end of the male member comes out of the seals.

Improved sealing between the male member and female member is desirable as pressures increase at deeper ocean depths. Although the undersea hydraulic couplings of the type described above provide advantages over conventional undersea hydraulic couplings with soft seals or o-rings, it is desirable to include a third retained seal and to have seals that engage different diameters of the male member or probe.

SUMMARY OF THE INVENTION

The present invention resides in an undersea hydraulic coupling of the foregoing type including male and female members for fluid communication therebetween and valves for controlling fluid flow in each of the members. The present invention includes a male member or probe having a body with an external shoulder and a stepped external cylindrical surface, and a female member with a stepped internal bore. Three seals are retained in the stepped internal bore. One or more of the seals are elastomeric seals having a dovetail interfit with a seal retainer, and at least one of the seals is a hollow radial metal seal retained in the female member bore. At least one of the seals engages the smaller diameter of the male member or probe and at least one of the seals engages the larger diameter.

The present invention improves improved sealing at high pressures by providing three retained seals, and allowing a close fit of the male member to the corresponding sealing surfaces in the female member. This helps ensure higher seal reliability and longer seal life. The steps in the male member outer circumference and the different sealing diameters also allow hydraulic or sea pressure to bleed out or into the annulus between the male and female coupling members during insertion or withdrawal of the male member from the female member bore. As a result, the present invention helps prevent implosion of the seals due to sea pressure or hydraulic pressure when the end of the male member clears the seal and the sea pressure rushes into the annulus between the members. Thus, the present invention helps equalize pressure on the seals between the members.

DETAILED DESCRIPTION OF PREFERRED EMBODIMENTS

Figure 1A:
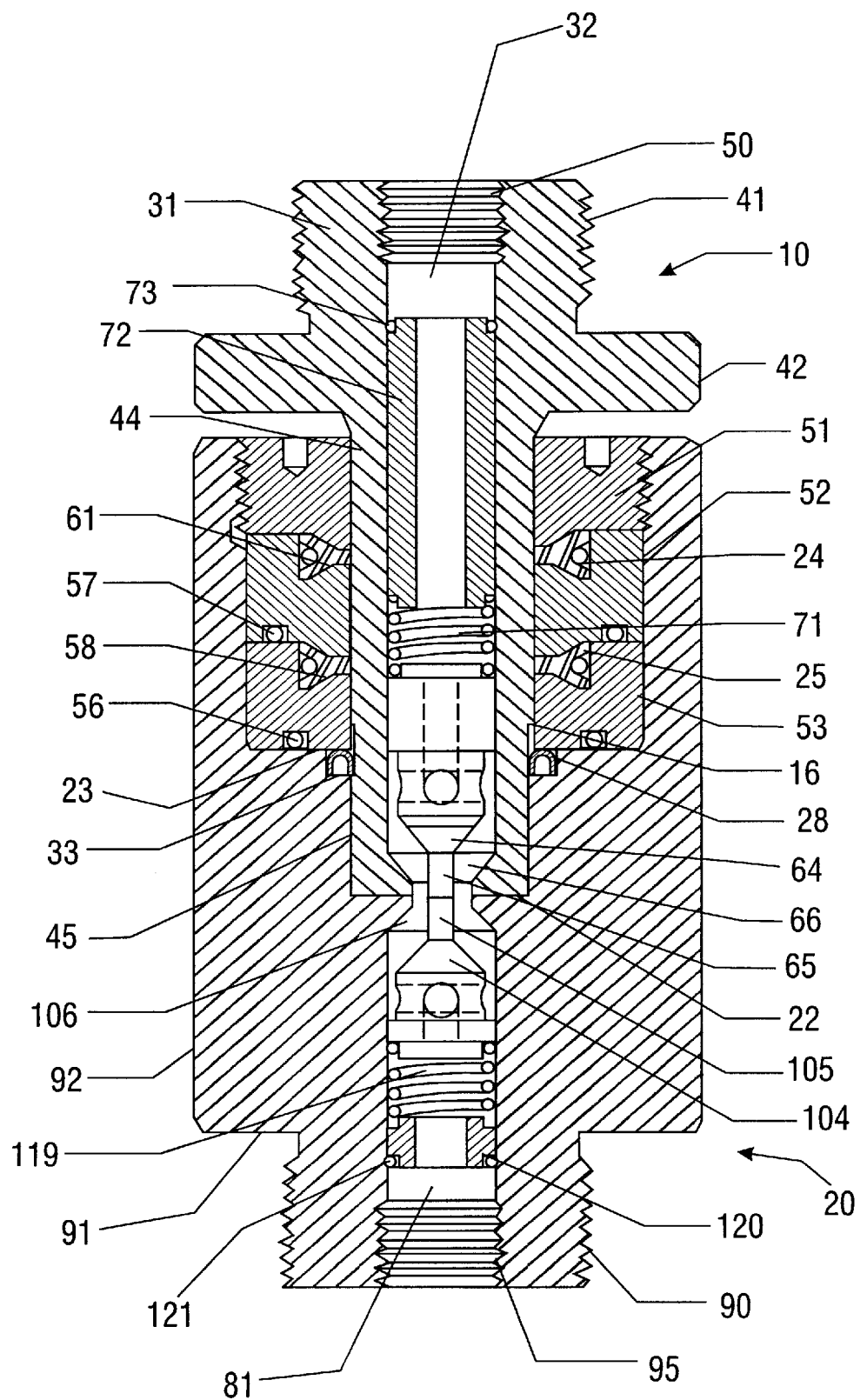
FIG. 1a is a sectional view of a first embodiment of the present invention showing the male member fully inserted into the female member of the coupling.

FIG. 1a is a sectional view of a first embodiment showing the male member 10 and the female member 20 as the male member is fully inserted into the female member bore. The male member 10 has a handle 31 and may be attached to a manifold plate with threads 41 or other means, such as set screws. The female member 20 may be attached to a second manifold plate by threads 90 or other means. Techniques for attaching the members to such plates are well known to those skilled in the art.

Male member 10 as shown in FIG. 1, comprises a probe handle 31, flange 32, and a stepped probe having a first smaller diameter 45 and a second larger diameter 44. Preferably, the step or circumferential shoulder 16 measures $10/1000$ inch on radius. Thus, in a preferred embodiment, second diameter 44 is $20/10000$ greater than first diameter 45. For example, if first diameter 45 is 0.625 inches, second diameter 45 preferably is 0.645 inches. The shoulder or step may be at a right angle, or may be beveled to form a positive angle as shown in FIG. 1a. The male member probe wall is dimensioned for sliding engagement with female member 20 and the seal retainers as will be discussed in more detail below.

The body of the male member also is provided with a central bore 32. The bore may have several variations in its diameter as it extends through the body of the male member 10. In a preferred embodiment, the first end of the central bore comprises an internally threaded section 50 for connection to a hydraulic line. Adjacent and inboard of the threaded section is a cylindrical passageway extending longitudinally within the male member body and terminating at valve seat 66 which is an inclined shoulder.

As shown in FIG. 1a, the poppet valve assembly of the male member is slidably received within the central bore 32. Cylindrical hollow valve head 64 has an outer diameter dimensioned to slide within the cylindrical bore. The valve head is conical in shape and dimensioned to seat on valve seat 66 at the end of the male member bore. The valve head also has a stem 65 or actuator extending therefrom. Helical valve spring 71 is used to urge the valve 64 into a closed position against the valve seat 66. Helical valve spring 71 is located within the cylindrical bore 32 and anchored with spring collar 72 which is held in place by collar clip 73.

The female member 20 comprises a handle 90 which is optionally threaded to a manifold plate. Female member 20 also includes a shoulder 91 which is adjacent the handle 90 and the main cylindrical body 92. The central bore 81 has several variations in its diameter, as it extends longitudinally or axially through the body of the female member 20. At a first or outer end of the central bore 81 is a threaded internal passageway 95 for connection to a threaded hydraulic line. The threaded portion 95 of the central bore 81 terminates at a cylindrical passageway which slidably receives a poppet valve assembly. The cylindrical passageway terminates at valve seat 106 for seating poppet valve 104. Inboard of the valve seat is a cylindrical receiving chamber 22 that receives the probe or male member 10. As shown in FIG. 1, when the actuators of the poppet valves are in contact with another, the valves are forced into open positions for hydraulic fluid flow between the male and female members.

The valve assembly of the female member 20 comprises a poppet valve 104 which is slidably received within the cylindrical passageway of the female member 20. The poppet valve 104 has a generally conical shape for seating at valve seat 106, and a stem 105 or actuator extending therefrom. To urge the valve into the closed position, helical valve spring 119 is mounted between the shoulder of the valve and spring collar 120 having collar clip 121 in the female member bore. The valves of the female member and the male member are preferably identical in components and function.

The female member bore has a shoulder 33 which is dimensioned to provide a surface for positioning a ring-shaped radial hollow metal seal 28 thereon. The hollow radial metal seal is preferably expansible in response to fluid pressure in its internal cavity to expand radially outwardly against the female member and radially inwardly against the first diameter 45 of the male member. As shown in FIG. 1a, radial metal seal 28 engages the first, narrower diameter of the probe, while the elastomeric dovetail seals 24 and 25 engage the second, larger diameter of the probe.

Figure 3:
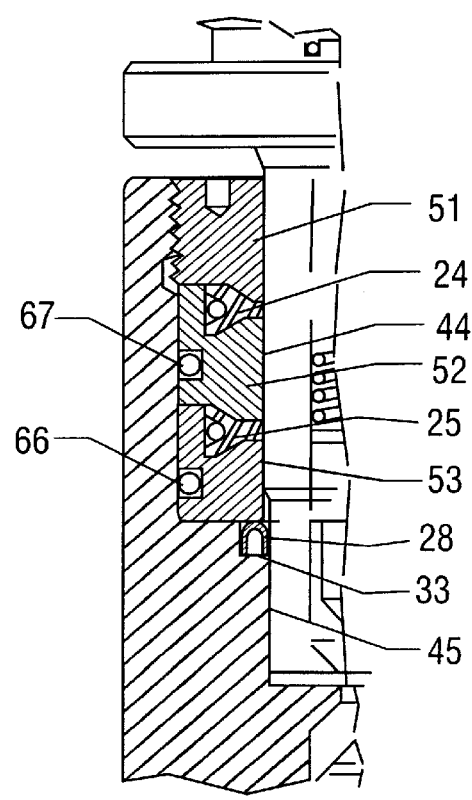
FIG. 3 is a sectional view of the seals and seal retainer of FIGS. 1a and 1b while the male member is fully inserted therein.

The seals are held in the female member by a three-part seal retaining sleeve which is also referred to herein as the first retainer, second retainer, and third retainer. The radial hollow metal seal is held in place on shoulder 33 by first retainer 53. First retainer 53 has an outer circumference dimensioned to slide into the female member and abut shoulder 23 in the female member bore. First retainer 53 has an internal diameter dimensioned to allow sliding insertion of second diameter 44 of the male member therethrough. In this embodiment, the surface of the first retainer 53 abutting shoulder 23 has an o-ring 56 positioned in a groove therein for engaging shoulder 33. The opposite surface of first retainer 53 has a reverse inclined surface for providing a dovetail interfit with elastomeric dovetail seal 25. The elastomeric dovetail seal 25 is held between first retainer 53 and second retainer 52. The dovetail interfit prevents the elastomeric dovetail seal 25 from movement radially into the bore due to removal of the male member at high pressure. In a preferred embodiment, o-ring seal 57 is held in a groove in the end of second retainer 52. The opposite surface of second retainer 52 has a reverse inclined surface 61 to provide a dovetail interfit for elastomeric dovetail seal 24. This second elastomeric dovetail seal is held between second retainer 52 and third retainer 51. Third retainer 51 is preferably threaded to the female member, although it may be held to the female member with a snap ring or other means. As shown in FIG. 3, the pair of elastomeric dovetail seals 24, 25 engage second diameter 44 of the male member or probe, while radial hollow metal seal 28 engages the first, narrower diameter 45.

Figure 1B:
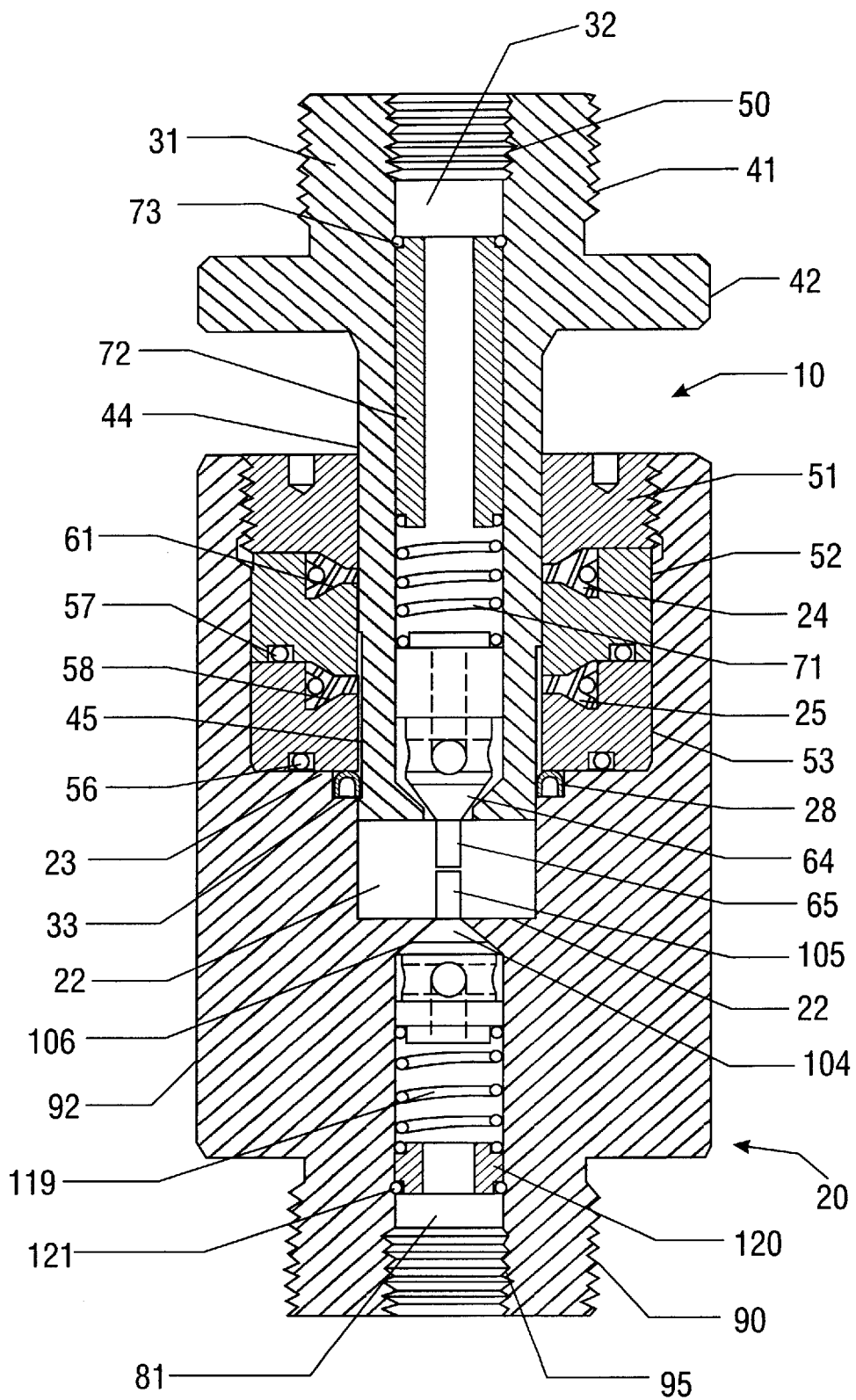
FIG. 1b is a sectional view of a first embodiment showing the male member partially inserted into the female member of the coupling.

Now referring to FIG. 1b, a first embodiment of the undersea hydraulic coupling is shown with the male member partially inserted or withdrawn from the receiving chamber of the female member. Prior to engagement of elastomeric dovetail seal 24 with second diameter 44, there is sufficient clearance between the first diameter of the male member and the retainers and seals to allow escape of hydraulic fluid and/or sea water from the annulus between the male and female members. Elastomeric dovetail seal 24 then engages second diameter 44 of the male member before elastomeric dovetail seal 25 engages that same diameter. Also, as shown in FIG. 1b and FIG. 3, hollow metal seal 28 engages the first diameter 45 of the male member, thereby effectuating a second seal that is enhanced as fluid pressure increases because the hollow metal seal expands in response to hydraulic pressure and/or sea water acting on the cavity thereof.

Figure 2:
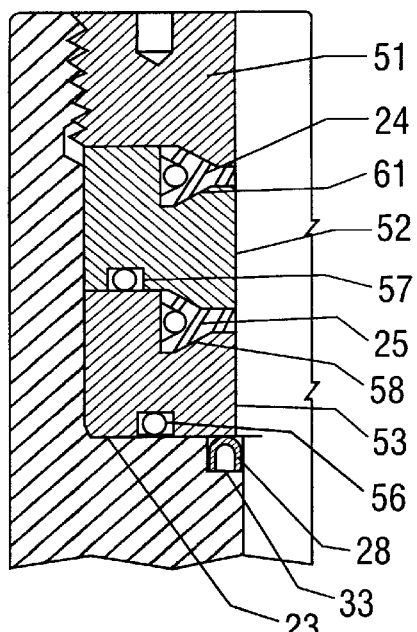
FIG. 2 is a sectional view of the seals and seal retainer shown in FIGS. 1a and 1b.

In FIG. 3, the structure of the elastomeric dovetail seal and hollow radial metal seal are identical to that of FIGS. 1a, 1b and 2, but o-rings 66 and 67 in FIG. 3 are positioned around the outer circumference of first retainer 53 and second retainer 52. Thus, in the embodiment of FIG. 3, the o-rings seal between the outer circumference of the first and second retainers and the bore of the female member.

Figure 4:
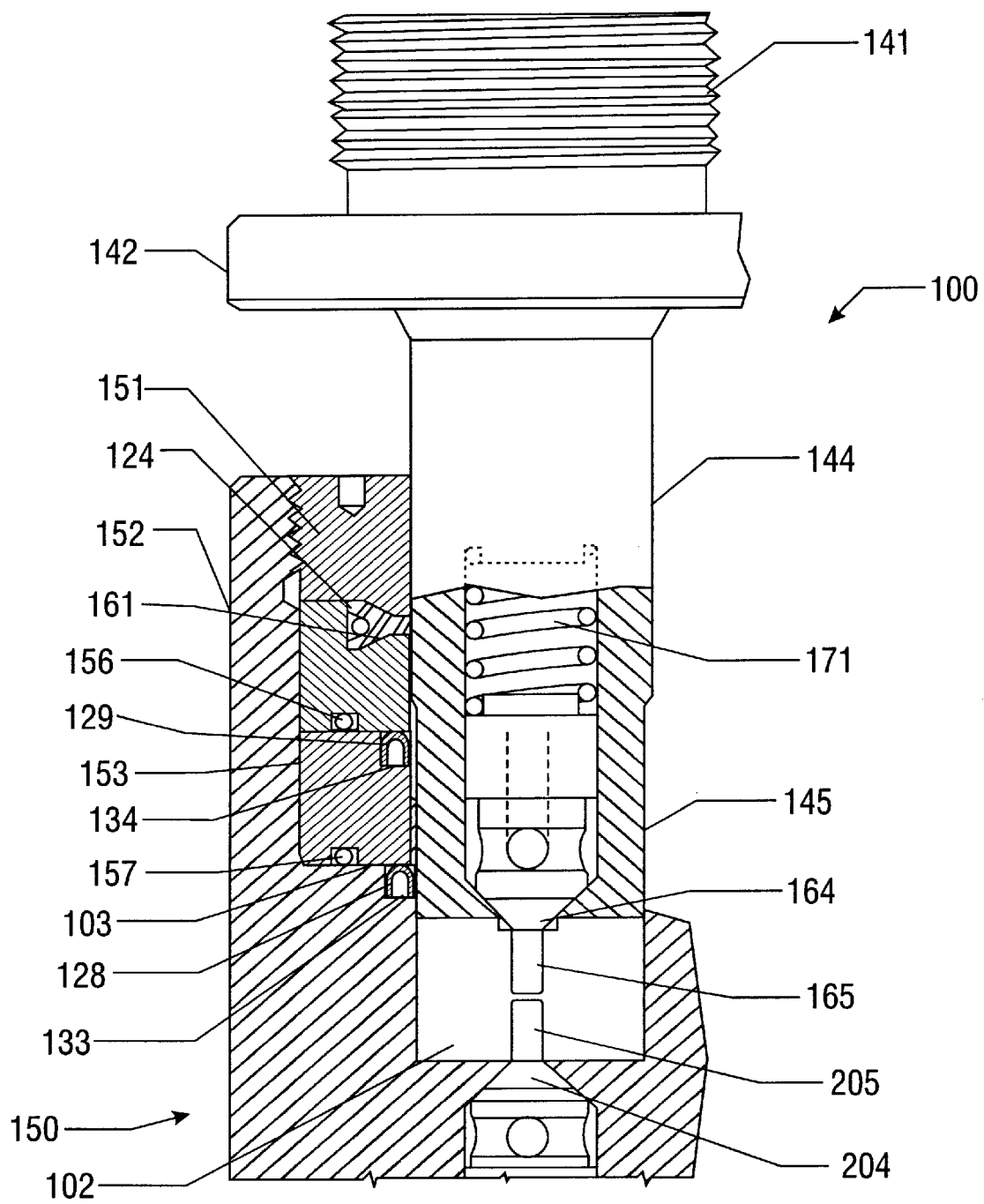
FIG. 4 is a partial sectional view of a second embodiment of the present invention, showing the male and female members of the coupling with the male member partially inserted into the female member bore.

Now referring to FIG. 4, a second embodiment of the invention is shown in partial section. In this embodiment, male member 100 has a threaded handle 141, a flange 142 and a stepped probe wall having a first diameter 145 and a second larger diameter 144. The male member also includes a poppet valve 164 having a valve actuator 165, and the poppet valve is urged into the closed position by valve spring 171. Similarly, the female member 150 includes a poppet valve 204 with a valve actuator 205. The receiving chamber 102 of the female member has an internal shoulder 133 for positioning hollow radial metal seal 128 thereon. As in the first embodiment, the hollow radial metal seal engages first diameter 145, which is the smaller diameter of the male member or probe. A second shoulder 103 in the female member bore allows positioning of first retainer 153 thereon. First retainer 153 holds the hollow radial metal seal 128 on shoulder 133. The internal diameter of first retainer 153 is dimensioned to allow sliding insertion of the second, larger diameter 144 of the male member or probe. In this embodiment, the surface of first retainer 153 in contact with shoulder 103 has an o-ring 157 for sealing engagement with shoulder 103. The opposite surface of first retainer 153 has a shoulder 134 for positioning a second hollow radial metal seal 129 thereon. The second hollow radial metal seal 129 preferably has a nominal internal diameter dimensioned to extend slightly inwardly from the internal diameter of first retainer 153 but not sufficiently to engage the first diameter 145 of the male member. Rather, the hollow radial metal seal 129 has an internal diameter, when preloaded or pressure energized, sufficient to engage the second, larger diameter 144 of the male member or probe. To hold second hollow radial metal seal 129 on shoulder 134, second retainer 152 is positioned in the receiving chamber against first retainer 153. Preferably, second retainer 152 has an internal diameter the same as first retainer 153, such that both the first and second retainers allow sliding insertion of the male member diameter 144 therein. Preferably, an o-ring seal 156 is positioned in a groove in the second seal 152 to seal between the first and second retainers. The opposing surface of the second retainer 152 has a reverse inclined surface 161 for providing a dovetail interfit with elastomeric dovetail seal 124. A third retainer 151 provides the opposing dovetail surface for holding elastomeric dovetail seal 124 in place and preventing implosion of elastomeric dovetail seal if the pressure in the coupling bore urges the seal inwardly. The third retainer preferably is threaded to the female member body, but also may be held in place with a clip or other means.

In this second embodiment of the invention, as shown in FIG. 4, hollow radial metal seal 128 engages the first, smaller diameter 145 of the male member before hollow radial metal seal 129 engages the second, larger diameter 144 of the male member. And, as described above with respect to the first embodiment, prior to engagement of hollow radial metal seal 128 with the male member, there is sufficient clearance for excess hydraulic fluid and/or sea water to escape out through the gap between the male member diameter 145 and the internal diameter of retainers 151, 152 and 153.

As shown in FIG. 4, the valves in each member are biased closed until after seals 128 and 124 engage the first diameter 145 and the second diameter 144 of the male member respectively. Then, after two of the seals engage, the third seal engages at or near the same position as is necessary for the male and female member poppet valves to open and allow fluid flow between the members. Although the particular seal arrangement of the three retained seals in the first and second embodiments is preferred in the undersea hydraulic coupling of the present invention, it is contemplated that additional seals also may be used in the present invention. Those seals should be reusable and retained in place upon separation of the male and female members of the coupling. At least two of the seals engage different diameters of the male member before the poppet valves in the male and female members open to provide fluid communication between the coupling members.

It will now be understood by those of skill in the art that an improved undersea hydraulic coupling may be made utilizing the present invention. Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling comprising:
   (a) a male member having a cylindrical body with a first diameter, a second diameter larger than the first diameter, and a step between the first and second diameters;
   (b) a female member having a receiving chamber for receiving the male member therein, the receiving chamber having first and second circumferential shoulders;
   (c) a hollow metal seal positioned on the first circumferential shoulder in the receiving chamber, the hollow metal seal having an inner diameter dimensioned to sealingly engage the first diameter of the male member when the male member is inserted through the hollow metal seal;
   (d) a first seal retainer positioned on the second circumferential shoulder in the receiving chamber, the first seal retainer holding the hollow metal seal on the first circumferential shoulder;

(e) a second seal retainer in the receiving chamber positioned adjacent the first seal retainer;

(f) a first elastomeric seal having a dovetail interfit between the first and second seal retainers, the first elastomeric seal having an inner diameter dimensioned to engage the second diameter of the male member when the male member is inserted through the first elastomeric seal;

(g) a third seal retainer in the receiving chamber positioned adjacent the second seal retainer, the third seal retainer engaged to the female member; and (h) a second elastomeric seal having a dovetail interfit between the second and third seal retainers, the second elastomeric seal having an inner diameter dimensioned to engage the second diameter of the male member when the male member is inserted through the second elastomeric seal before the male member is inserted through the first elastomeric seal.

2. The undersea hydraulic coupling of claim 1 wherein the third seal retainer is threaded to the female member.

3. The undersea hydraulic coupling of claim 1 further comprising at least one o-ring seal between one of the seal retainers and the receiving chamber.

4. The undersea hydraulic coupling of claim 1 further comprising at least one o-ring seal between two of the seal retainers.

5. The undersea hydraulic coupling of claim 1 wherein the male member and female member have normally closed poppet valves therein for controlling fluid flow between the members.

6. The undersea hydraulic coupling of claim 5 wherein the hollow metal seal engages the first diameter of the male member and the second elastomeric seal engages the second diameter of the male member when the poppet valves of the male and female members are closed.

7. An undersea hydraulic coupling comprising:

(a) a male member having a body with an internal bore therethrough and a normally closed poppet valve in the bore, the body having a cylindrical outer surface with a first end and a second end, the cylindrical outer surface adjacent the first end having a first diameter and the cylindrical outer surface adjacent the second end having a second diameter larger than the first diameter;

(b) a female member having a body with an internal bore therethrough, a normally closed poppet valve in the bore, the bore having a receiving chamber dimensioned to receive the male member therein, the receiving chamber having an internal shoulder;

(c) a three-part seal retaining sleeve positioned in the receiving chamber, the three-part seal retaining sleeve having an inner diameter dimensioned to allow the second diameter of the male member to slide therethrough;

(d) three radial seals in the receiving chamber, the first radial seal positioned between a first part of the seal retaining sleeve and the internal shoulder, the first seal dimensioned to engage the first diameter of the male member, the second radial seal positioned between the first and second parts of the seal retaining sleeve, and the third radial seal positioned between the second and third parts of the seal retaining sleeve, the second and third radial seals dimensioned to engage the second diameter of the male member.

8. The undersea hydraulic coupling of claim 7 wherein the first radial seal is a hollow metal seal that is pressure-energized to expand radially outwardly against the receiving chamber and radially inwardly against the first diameter of the male member.

9. The undersea hydraulic coupling of claim 7 wherein the first and second radial seals are hollow metal seals that are pressure-energized to expand radially outwardly against the receiving chamber and radially inwardly against the first diameter of the male member.

10. The undersea hydraulic coupling of claim 7 wherein the third radial seal is an elastomeric seal having a dovetail interfit between the second and third parts of the seal retaining sleeve to restrain the third radial seal from moving radially inwardly.

11. The undersea hydraulic coupling of claim 7 wherein the second radial seal is an elastomeric seal having a dovetail interfit between the first and second parts of the seal retaining sleeve, and the third radial seal is an elastomeric seal having a dovetail interfit between the second and third parts of the seal retaining sleeve, to restrain the second and third radial seals from moving radially inwardly.

12. A female member of an undersea hydraulic coupling comprising:

(a) a female member with an internal bore;

(b) a seal retaining member inserted into the bore and engagable with the female member; and (c) a male member insertable through the seal retaining member, the male member having a smaller diameter and a larger diameter;

(d) first, second and third radial seals held in place by the seal retaining member, each of the radial seals having an inner diameter, the first radial seal having a smaller inner diameter than the second and third seals, the first seal engaging the smaller diameter and the second and third seals engaging the larger diameter of the male member when fully inserted therethrough, the seals being removable from the female member only upon disengagement of the seal retaining member from the female member.

13. The female member of the undersea hydraulic coupling of claim 12 wherein two of the radial seals are pressure-energizable hollow metal seals.

14. The female member of an undersea hydraulic coupling of claim 12 wherein two of the radial seals are elastomeric seals having a dovetail interfit with the seal retaining member.

15. The female member of an undersea hydraulic coupling of claim 12 wherein the seal retaining member is threaded to the female member.

\* \* \* \* \*

UNITED STATES PATENT AND TRADEMARK OFFICE
CERTIFICATE OF CORRECTION

PATENT NO.   : 5,983,934
DATED        : November 16, 1999
INVENTOR(S)  : Robert E. Smith, III It is certified that error appears in the above-identified patent and that said Letters Patent is hereby corrected as shown below:

Title page,
Item [56], U.S. PATENT DOCUMENTS, please add:

| | | | |
|---|---|---|---|
| -- 4,709,726 | 12/1987 | M. Fitzgibbons | 137/614.04 |
| 4,834,139 | 5/1989 | M. Fitzgibbons | 137/614.04 |
| 3,899,199 | 8/1975 | R. Garey | 285/27 |
| 4,709,727 | 12/1987 | R. Gober | 137/625.66 |
| 4,588,030 | 5/1986 | W. Blizzard | 166/120 |
| 5,368,070 | 11/1994 | K. Bosley | 137/614.04 |
| 5,343,891 | 9/1994 | K. Bosley | 137/614.04 |
| 4,597,413 | 7/1986 | R. Buseth | 137/614.04 |
| 911,808 | 2/1909 | S. Condon | |
| 2,521,692 | 9/1950 | W. A. Costello | 286/26 |
| 4,553,776 | 11/1985 | P. L. Dodd | 285/212 |
| 1,583,931 | 5/1926 | B. P. Joyce | |
| 1,835,877 | 12/1931 | B. P. Joyce | |
| 4,658,847 | 4/1987 | J. A. McCrone | 137/72 |
| 4,768,538 | 9/1988 | Mintz, et al. | 137/15 |
| 3,172,670 | 3/1965 | M. Pras | 277/112 |
| 4,324,407 | 4/1982 | Upham, et al. | 277/27 |
| 3,730,221 | 5/1973 | A. M. Vik | 137/614 |
| 4,637,470 | 1/1987 | Weathers, et al. | 166/344 |
| 869,536 | 10/1907 | J.C.W. Weber | |
| 5,337,782 | 8/1994 | W. Wilcox | 137/614.03 |
| 5,072,755 | 12/1991 | W. Wilcox | 137/614.03 |
| 5,063,965 | 11/1991 | W. Wilcox | 137/614.03 |
| 5,355,909 | 10/1994 | R. Smith III | 137/614.04 |
| 5,099,882 | 03/31/92 | R. Smith III | 137/614.04 |
| 5,052,439 | 10/01/91 | R. Smith III | 137/614.04 |
| 4,900,071 | 02/13/90 | R. Smith III | 285/379 |

UNITED STATES PATENT AND TRADEMARK OFFICE
CERTIFICATE OF CORRECTION

PATENT NO.    : 5,983,934
DATED         : November 16, 1999
INVENTOR(S)   : Robert E. Smith, III It is certified that error appears in the above-identified patent and that said Letters Patent is hereby corrected as shown below:

| 4,832,080 | 05/23/89 | R. Smith III | 137/614.04 |
| 3,394,941 | 07/30/68 | H. A. Traub  | 277/144    |
| 3,718,338 | 02/27/73 | H. A. Traub  | 277/165 -- |

Signed and Sealed this

Seventeenth Day of June, 2003

JAMES E. ROGAN
*Director of the United States Patent and Trademark Office*